April 14, 1925.
J. L. BREESE, JR
1,533,630
COMBINED HOUSE HEATING AND DOMESTIC WATER HEATING SYSTEM
Filed Aug. 26, 1921
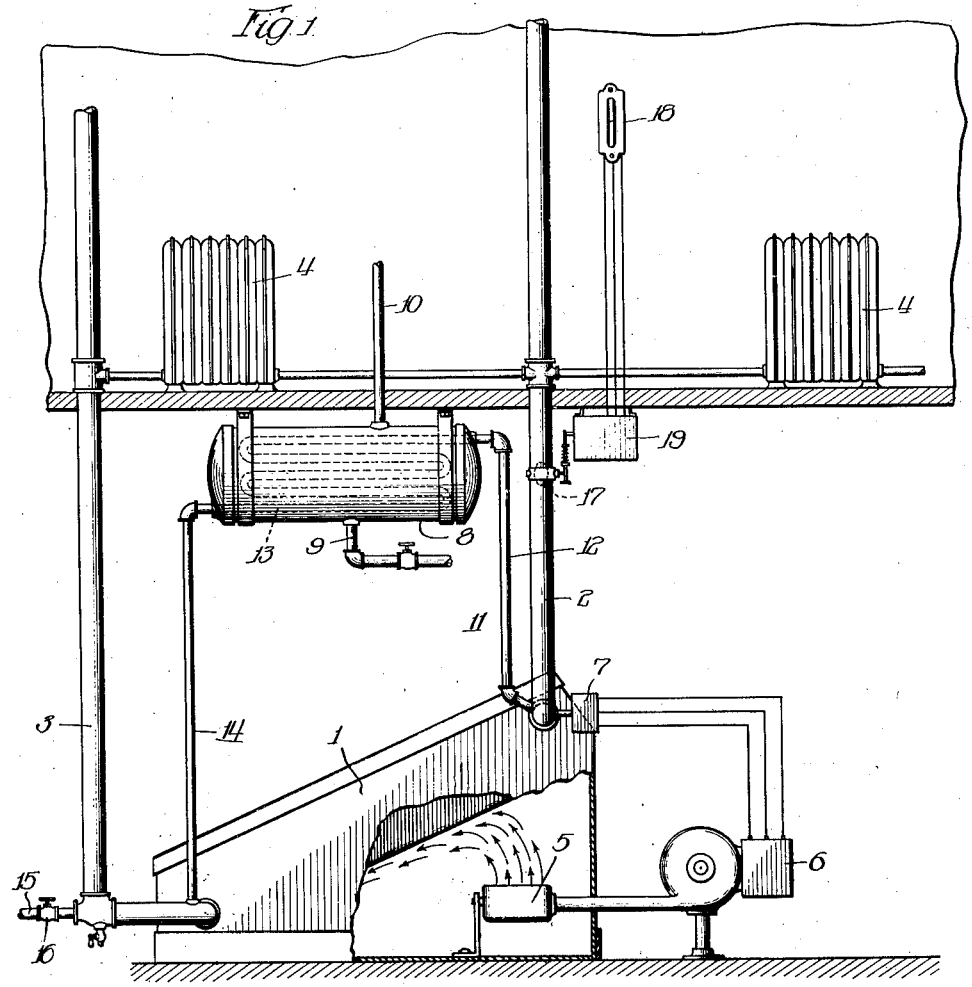
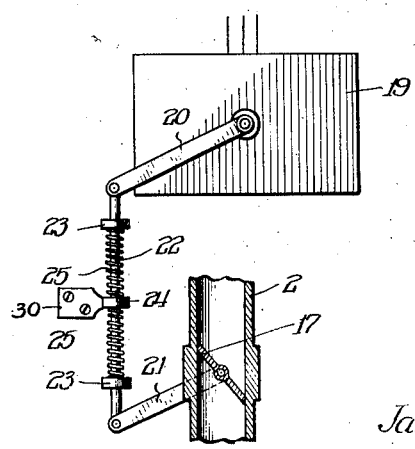
Witness:
R. Burkhardt
Inventor:
James L. Breese Jr.
By Wilkinson, Huxley, Byron & Knight
attys Patented Apr. 14, 1925.

1,533,630

UNITED STATES PATENT OFFICE.

JAMES L. BREESE, JR., OF CHICAGO, ILLINOIS, ASSIGNOR TO BREESE & BETTLE, INC., OF CHICAGO, ILLINOIS, A CORPORATION OF ILLINOIS.

COMBINED HOUSE-HEATING AND DOMESTIC WATER-HEATING SYSTEM.

Application filed August 26, 1921. Serial No. 495,457.

*To all whom it may concern:*

Be it known that I, JAMES L. BREESE, Jr., a citizen of the United States, residing at Chicago, in the county of Cook and State of Illinois, have invented certain new and useful Improvements in Combined House-Heating and Domestic Water-Heating Systems, of which the following is a specification.

The present invention relates to combined house heating and domestic water heating systems.

More particularly, the present invention relates to heating systems in which the supply of heating medium to the house heating devices is varied materially as atmospheric temperatures change but in which it is desirable to maintain a supply of hot water for domestic purposes, regardless of atmospheric temperature changes.

The present invention has for one of its objects the provision of a system where in the house heating devices and the means for heating the domestic water supply may be economically combined.

A further object is to provide a combined house heating and domestic water heating system for efficient all year operation.

A further object is to provide means for economically supplying hot water at all times without the use of other burners than those provided for house heating purposes.

A further object is to provide a combined system of the nature referred to in which the time lag which is common in house heating devices is materially reduced.

Further objects will appear as the description proceeds.

Referring to the drawings—

Figure 1 represents diagrammatically a system embodying the present invention.

Figure 2 represents a detail of construction.

A boiler is represented by the numeral 1, which boiler is provided with an outgoing pipe 2 and a return pipe 3. Connected across the system between said pipes 2 and 3 are the house heating devices 4—4, indicated as radiators. The boiler 1 is heated by a burner 5, the flame of which is regulated by the control mechanism 6 which is responsive to the thermostatic device 7. The details of the thermostatic device 7 and control mechanism 6 need not be described herein, inasmuch as said details form no part of the present invention. Devices suitable for this purpose are well known to those skilled in the art.

The numeral 8 represents a tank for containing water for domestic use. Said tank is provided with an inlet pipe 9 and outlet pipe 10, said inlet pipe 9 being connected to a source of water supply and said outlet pipe 10 leading to the faucets or other hot water delivery devices in the house. Connected across the boiler 1 is a circulating system, which is indicated as a whole by the numeral 11. Said circulating system 11 includes the outgoing pipe 12, a heating coil 13 in the tank 8 and the return pipe 14. The heating coil 13 constitutes means for heating the water within the tank 8 for domestic purposes.

Connected to the return pipe 3 from the heating devices is a small pipe 15 having a valve 16 for connection to a source of water, whereby water may be added to the boiler from time to time as may be found necessary. Connected in the outlet pipe 2 of the boiler is the valve 17 which may be controlled by the thermostat 18, which will be conveniently placed in the house, being responsive to the temperature of the atmosphere system 11 including pipe 12, heating coil 13 and pipe 14 should be placed so that operation of valve 17 will not interfere with the supply of heating medium to said system. For this reason the pipe 12 should be connected at a point closer to the boiler than valve 17.

One means for controlling the valve 17 is shown in detail in Figure 2. The thermostatic device 18 operates controlling mechanism 19, which operates an arm 20. The valve 17 is provided with an arm 21, said arms 20 and 21 being connected together by means of any preferred resilient connection. According to the device illustrated, the two arms are connected together by means of a tie rod 22, which is provided with a pair of adjustable abutments 23—23, each placed near one end of said tie rod 22. The numeral 24 represents a fixed abutment, mounted independently of rod 22. Compression springs 25—25 will be mounted between fixed abutment 24 and abutments 23—23, whereby to take up any shock which would otherwise be communicated to the valve 17 by reason of movement of the arm 20. Abutment 24 is formed with a base plate 30 which may be attached to any convenient support.

From the foregoing description, it will be clear that the domestic water heater and the house heating devices are supplied from a single boiler. The valve 17 will respond to the thermostat 18, to control the supply of heating medium to the house heating devices to hold the proper temperature in the house without interfering with the supply of heating medium to the domestic water heating coil 13.

The temperature of the heating medium in coil 13 controls the temperature of water in tank 8 and also controls the thermostat 7 which governs the heater 5. The thermostat 7 should be placed at a point where it will immediately respond to the heating medium flowing both to the house heating devices and to the domestic water heating device, the preferred position being the junction of pipe 2 and pipe 12 with boiler 1. The system has decided advantages due to the fact that a house heating system may be used efficiently for supplying hot water for domestic purposes even when the house heating devices are not in service. Due to the intermittent flame of burner 5, the medium in boiler 1 may be kept within the desired limits of temperature, circulation being had through circulating system 11. Preferably, the boiler 1 will be chosen of relatively small water capacity and the medium therein will be raised to a comparatively high temperature in a short period of time. After the flame of burner 5 has been reduced, circulation through pipe 12, coil 13 and pipe 14 will continue until the temperature of the medium in said system has become uniform. The system therefore operates economically when both the house heating devices and the domestic water heater are making demands on the boiler and also operates efficiently when only the domestic water heater is making demands on the boiler.

The system illustrated and described reduces the time lag which is so objectionable in present house heating systems which involve a transfer of heating medium from a boiler to a plurality of heating devices. In ordinary house heating systems, wherein a heater for a boiler is controlled in response to atmospheric temperatures, when the flame in such heaters is reduced, the hot medium in the boiler will mount to the radiators and the boiler will be filled with cold medium. Gradually the entire house heating system will become cold. When the flame is turned up under the boiler, there is a time lag in starting circulation due to the fact that the boiler is cold and must first be heated up. In the system according to the present invention however, the valve 17 traps hot medium in the boiler which can be instantly drawn upon when the valve 17 is opened. Inasmuch as it is usually desirable to maintain a supply of hot water for domestic purposes, the advantage of immediate availability of the heating medium for house heating purposes is had without the added expense of maintaining a flame for that specific purpose. It will be understood of course, that the valve 17 instead of being automatically controlled may be operated manually, if preferred.

One embodiment of the present invention has been described in detail. Many modifications will occur to those skilled in the art. It is intended in this application to cover all such modifications that fall within the scope of the invention as defined by the appended claims.

What I claim as new and desire to secure by Letters Patent in the United States, is:

1. In a heating apparatus, a boiler, a pair of independent heating medium circuits, said circuits having the boiler as a common source of supply, and one thereof supplying house heating devices, the other operatively connected to a hot water storage tank, a burner for supplying heat to the boiler, thermostatic means responsive to boiler temperature for controlling the burner, and thermostatic means responsive to house temperature conditions for cutting in or out the house heating circuit.

2. In a heating apparatus, a boiler, a pair of independent heating medium circuits, said circuits having the boiler as a common source of supply and one thereof supplying house heating devices, the other operatively connected to a hot water storage tank, a burner for supplying heat to the boiler, thermostatic means responsive to the temperature of said circuits at the junction thereof for controlling the burner, and thermostatic means responsive to house temperature conditions for cutting in or out the house heating circuit.

Signed at Chicago, Illinois, this 20th day of August, 1921.

JAMES L. BREESE, Jr.